July 9, 1968
W. J. DALY
3,391,491
TRELLIS STRUCTURE
Filed May 12, 1965
5 Sheets—Sheet 1
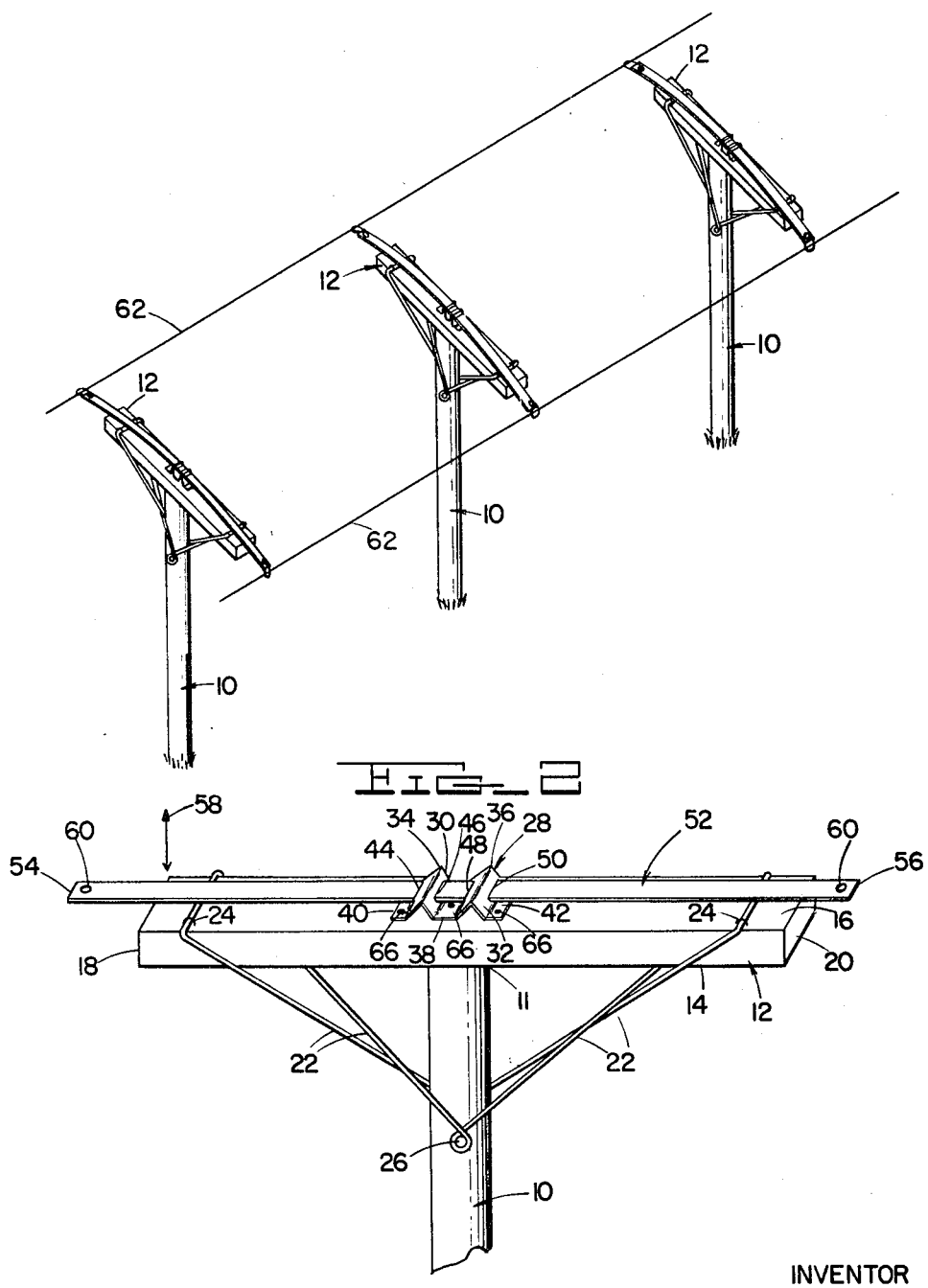
INVENTOR
WILLIAM J. DALY
BY Hood, Gust & Irish
ATTORNEYS

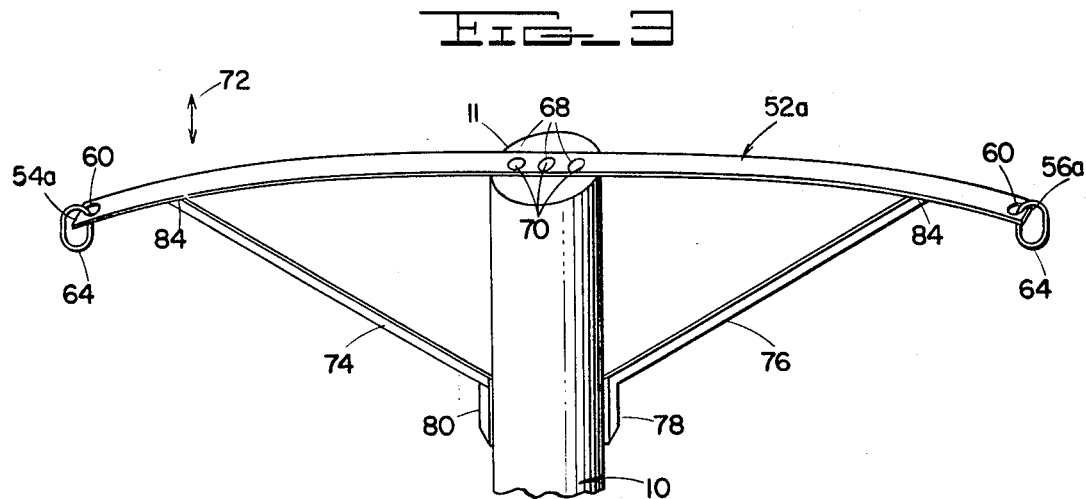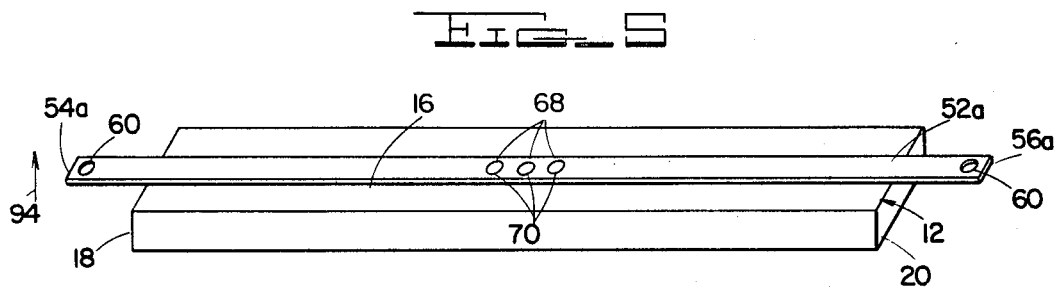

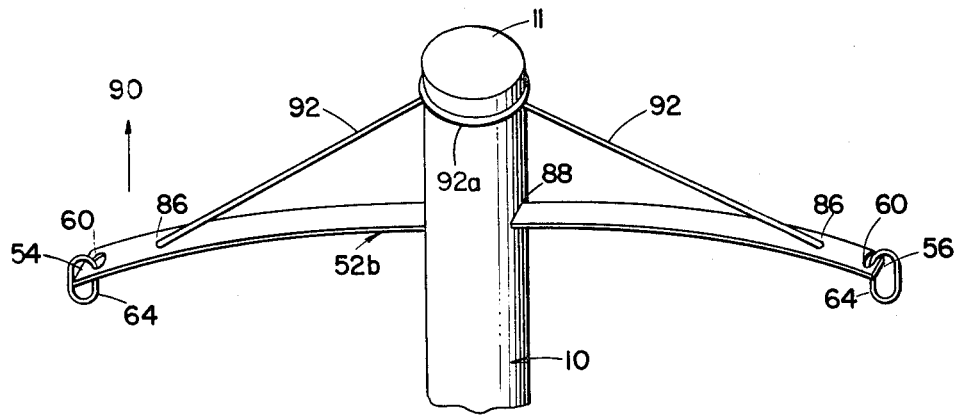
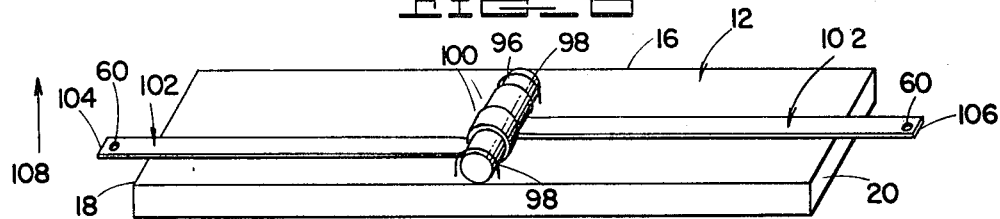
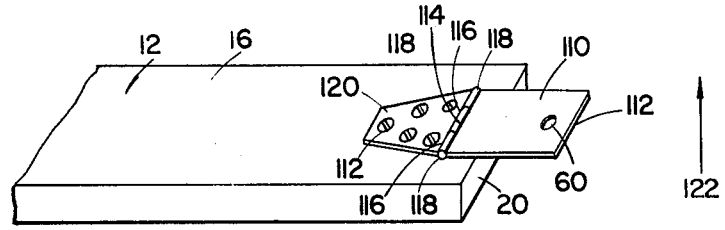

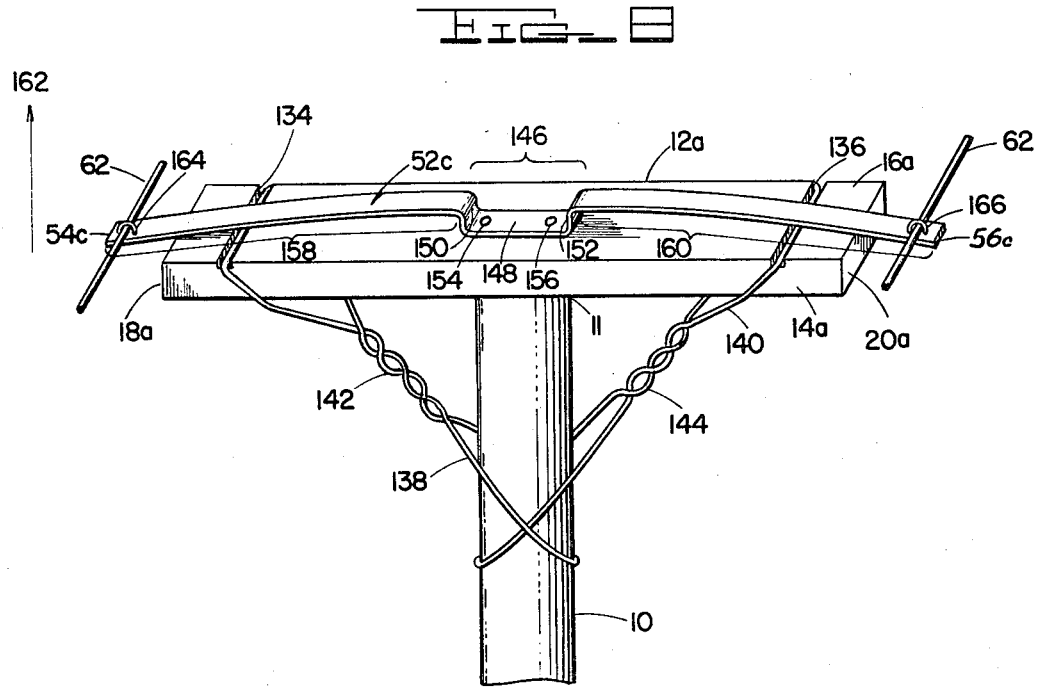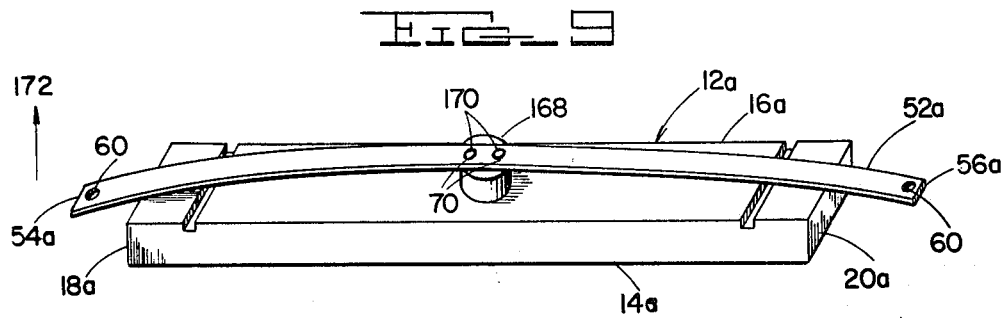

July 9, 1968  W. J. DALY  3,391,491
TRELLIS STRUCTURE
Filed May 12, 1965  5 Sheets-Sheet 5
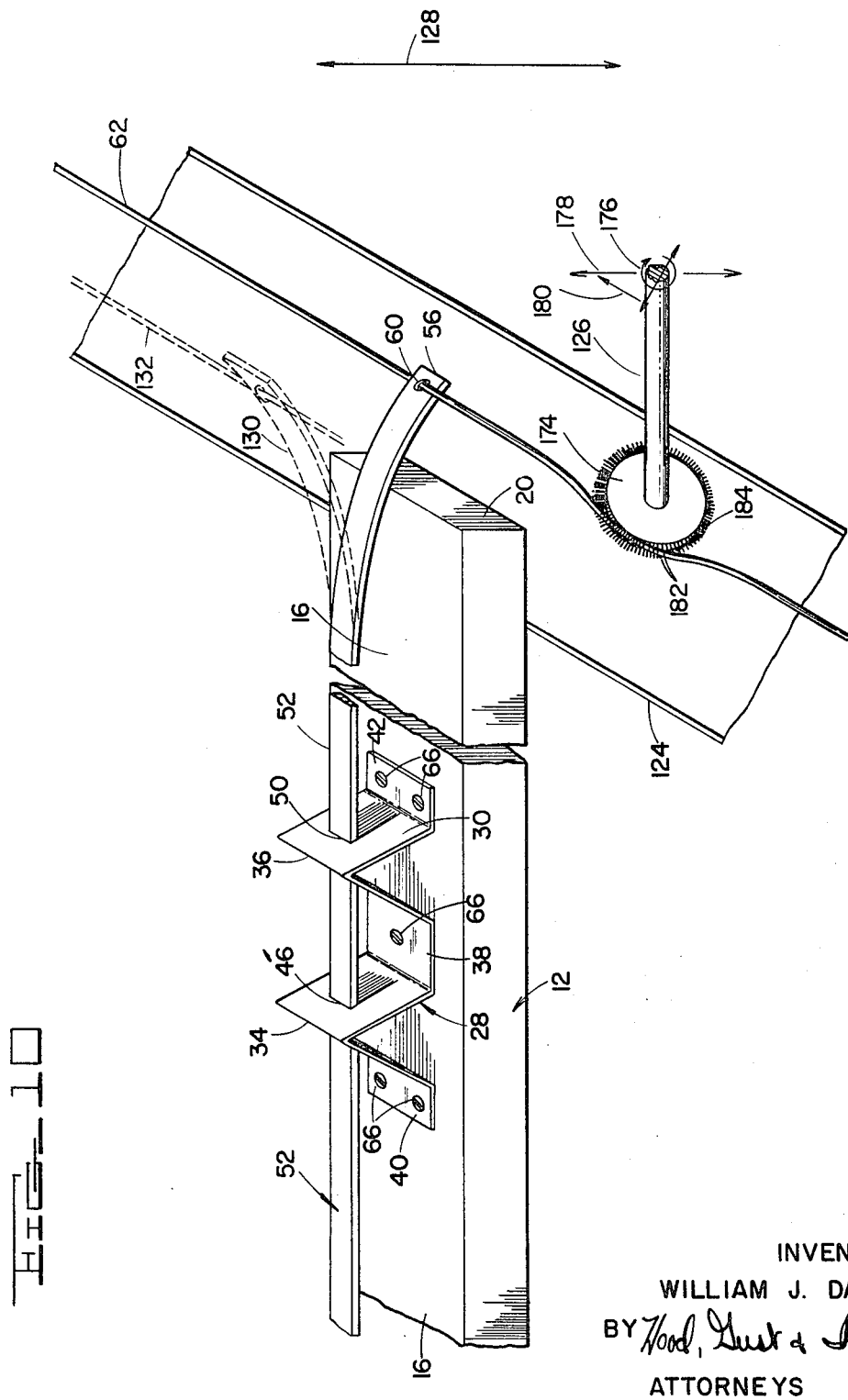
FIG_10
INVENTOR
WILLIAM J. DALY
BY Hood, Gust & Irish
ATTORNEYS

United States Patent Office 3,391,491
Patented July 9, 1968

3,391,491
TRELLIS STRUCTURE
William J. Daly, 1007 Straford Road,
New Haven, Ind. 46774
Filed May 12, 1965, Ser. No. 455,080
8 Claims. (Cl. 47—46)

The present invention relates generally to an improved trellis structure, and more particularly, to a trellis structure suitable for the growing of grapes and the mechanical harvesting of the same.

In the past, most trellises for commercial vineyards were of the same general type and consisted of a row of spaced-apart support posts firmly set in the ground in a substantially vertical position and two wires stretched tightly between the posts, one above the other. Such trellis structures support vines growing generally in the plane defined by the support posts and were entirely satisfactory from viticultural and economic viewpoints. However, unlike other fruit, grapes will not improve in either color or quality after they have been harvested; and therefore, grapes should not be gathered until fully ripe. Grapes picked before they are ripe lack sugar and flavor. Obviously, only patience in permitting the grapes to really ripen permits the full development of sugar, color and flavor. Further, fully ripe grapes are very delicate and clusters of grapes should be very carefully handled. Bruised berries or those with broken skin deteriorate rapidly. Still further, grapes that have been picked have to be shaded to protect them from the sun and should be allowed to wilt from four to six hours after picking before further handling as wilting tends to prevent the berries from shattering and splitting in packing. For these reasons, heretofore grapes were hand picked.

However, in recent years, mechanical harvesting techniques have been developed in all areas of fruit and vegetable production. Mechanical harvesting of grapes has become especially desirable in view of the high cost of manual labor, and the unavailability and undependability of workers. The Agricultural Department of the State of New York, one of the large grape producing states of the United States, has begun experimenting with training grapevines to grow in such a fashion that they would hang to one or both sides of the support posts of a grape trellis and over a moving collector with the thought that the grape berries could be caused to fall from the vines onto the collector by imparting to the vines a rapid up and down movement, and thus, harvested. Harvesting by this method, however, makes obsolete those trellises on which the vines grow generally in the plane defined by the support posts. Further, the mechanical harvesters that have been tested have not been entirely satisfactory for reasons including the fact that the up and down shaking motion imparted to the vine by the harvester scatters the grapes in all directions causing some of them to be lost resulting in a large waste; and further, that the vibratory motion of the harvester was found to destroy conventional trellis structures. This last-mentioned difficulty is extremely disadvantageous since the cost of building a trellis is always a substantial portion of the initial investment in any vineyard and repetitive maintenance of a trellis can be costly and can require hours of labor to a degree that frequent trellis repair may be the difference between a profitable and a marginal vineyard operation.

To remedy these trellis defects, several new designs of trellis structures have been suggested, and several more have been tested. However, each of these designs have been defective for one or more of the above-mentioned reasons. A desirable trellis structure from which grapes can be mechanically harvested must have, first, strength and rigidity such that the trellis is not deleteriously affected by the vibratory motion imparted to the overhanging vines on either side of the posts and remains stable during use; and second, a structure which limits the vibratory motion to a vertical motion thereby preventing scattering of the grapes shaken loose from the vines and providing that the grapes fall directly downwardly. Further, a desirable trellis structure should have a structure which supports a curtain of grapevine foliage on both sides of the support posts thereby utilizing a minimal number of posts per vineyard. Also desirable would be an inexpensive apparatus which can be attached to a currently usable trellis structure thereby modifying the existing trellis structure into a structure from which grapes can be mechanically harvested and a like apparatus which can be equally usable with new and old trellis structures which have split support posts. Further desirable is a trellis structure having features resulting in improved freedom from maintenance. A trellis structure having the above-mentioned desirable features would be preferred over any trellis structure now used or heretofore known for use with known mechanical grape harvesters of the type mentioned above.

It is therefore an object of this invention to provide an improved trellis structure having supporting means on which a curtain of grapevine foliage can be trained to grow and which may be vibrated by means of a mechanical harvester to successfully harvest grapes without causing damage to the trellis.

It is another object of this invention to provide a flexible bar which can be attached to each grapevine trellis support post in a manner such that a curtain of grapevine foliage can be supported thereby and moved only in a vertical direction to mechanically harvest grapes without damage to the trellis.

Yet another object of this invention is to provide a trellis structure having a bar extending transversely to the trellis and upon which a curtain of grapevine foliage may be grown, which is movable without stress being caused in the trellis itself in a manner such that the only significant movement is in a vertical direction whereby grapes can be successfully harvested from the foliage.

Still another object of this invention is to provide a superior trellis structure designed to withstand the stresses resulting from the mechanical harvesting of grapes from the vines growing thereon.

A further object of this invention is to provide an improved grape trellis structure which is relatively inexpensive and which can be used to modify currently usable trellis structures so that the grapes of the vines growing thereon can be harvested mechanically by known harvesting machines.

Still further an object of this invention is to provide an improved trellis structure which can be used to modify currently usable grape trellises having split posts and vine supporting structure of a height unsuitable for mechanical harvesting of grapes into a superior trellis structure from which grapes can be successfully harvested mechanically without damage to the trellis.

The above mentioned and other features and objects of this invention and the manner of attaining them will become more apparent and the invention itself will be best understood by reference to the following description of an embodiment of the invention taken in conjunction with the accompanying drawings, wherein:

FIG. 1 is a fragmentary, perspective view of one row of grape vine trellis support posts incorporating one embodiment of the improved trellis structure of this invention and illustrating a cordon wire extending between the posts on both sides thereof providing a trellis structure which can support a curtain of grape foliage on each side of the trellis structure;

FIG. 2 is a fragmentary, perspective and enlarged view of the embodiment of the trellis structure illustrated in FIG. 1 mounted on one of the grapevine trellis support posts;

FIG. 3 is a view similar to that of FIG. 2 illustrating a second embodiment of the improved trellis structure of this invention;

FIG. 4 is a view similar to that illustrated in FIGS. 2 and 3 showing a third embodiment of the improved trellis structure of this invention;

FIG. 5 is a perspective and enlarged view of the trellis element which extends transversely of the row of trellis support posts as shown in FIG. 1 illustrating a fourth embodiment of this invention secured to the upwardly facing surface of the trellis element;

FIG. 6 is a view similar to that of FIG. 5 showing a fifth embodiment of this invention;

FIG. 7 is a perspective, enlarged and fragmentary view of a trellis element such as that illustrated in FIGS. 5 and 6, showing a sixth embodiment of this invention secured to the upwardly facing surface thereof;

FIG. 8 is a view similar to that of FIG. 2 illustrating a seventh embodiment of the improved trellis structure of this invention;

FIG. 9 is a perspective and enlarged view of the trellis element illustrated in FIG. 8 showing an eighth embodiment of this invention secured to the upwardly facing surface thereof; and FIG. 10 is a fragmentary, perspective and diagrammatic view of the first embodiment of this invention illustrated in FIGS. 1 and 2, showing the means by which the curtain of grapevine foliage supported by the cordon wires extending between trellis support posts is vibrated and the grapes thereon harvested by known machinery.

In the broader aspects of this invention there is provided an elongated bar which is movable in one direction adjacent to at least one end thereof. Secured to the bar adjacent to the above-mentioned one end is a second means for supporting a cordon wire and a curtain of grapevine foliage. The bar is adapted to be attached to an upright post of a grape trellis extending transversely of the longitudinal directon of the trellis and in a manner such that the bar is significantly movable only in a generally vertical direction. The bar and cordon wire and the foliage thereon is movable by means of conventional grape harvesting machines without causing stresses in the trellis itself which are likely to damage the trellis.

Referring now to the drawings, and more specifically to FIGS. 1 and 2, there is shown one embodiment of the improved grapevine trellis of this invention. Conventionally, trellis structures all comprise a plurality of spaced-apart support posts 10 which are securely fixed in the ground in an upright position. Posts 10 are arranged in rows which extend between the boundaries in the vineyards in a direction such that the proper exposure is insured for each curtain of grapevine foliage growing thereon. Secured to each of the posts 10 and adjacent the top 11 thereof, in the embodiment of this invention illustrated in FIGS. 1 and 2, is a trellis element 12 which is elongated and has opposite facing surfaces 14, 16 and opposite ends 18, 20. Element 12 is secured to posts 10 intermediate ends 18, 20 with the top 11 of the posts 10 (not shown) abutted against the surface 14 near the middle thereof and with element 12 extending on both sides of posts 10 in a direction transverse to the direction of the row of posts 10 shown in FIG. 1. Means by which elements 12 are maintained in rigid securance to posts 10 in this position and prevented from moving relative thereto is provided by bracing element 22, one embodiment of which is shown in FIGS. 1 and 2, to comprise relatively stout wire secured to the surface 16 of elements 12 adjacent ends 18, 20, respectively, and to post 10 in a position beneath and spaced from element 12. In the embodiment of the bracing element 22 illustrated in FIGS. 1 and 2, bracing element 22 is secured to surface 16 by means of staples 24, and to posts 10 by means of a pin or fastener 26. In another embodiment of the bracing element 22 are supports 138, 140 illustrated in FIG. 8 and described hereinafter. Bracing element 22 can be designed in a variety of different constructions, each of which is solely for the purposes of maintaining element 12 in its preferred position relative to post 10 and to prevent movement therebetween during the normal use of the trellis as will be described hereinafter over the normal life time if the trellis. The trellis thus far described comprising post 10 and element 12 has been used prior to this invention; however, only the post 10 can be said to be conventional. Reference is made to the United States Patent No. 2,893,194, issued to Lamouria on July 7, 1959, in which there is disclosed a rigid T-shaped trellis similar to the structure above described.

Still referring to the FIGS. 1 and 2, and more specifically to FIG. 2, there is shown a support 28 which is secured to the surface 16 of the element 12 intermediate ends 18, 20 and preferably, directly over the top 11 of post 10. Support 28 comprises a rectangular piece 30 of rigid sheet metal folded in a particular manner. Sheet 30 has an upwardly facing surface 32 which initially and before folding defines a plane. Sheet 30 is folded at two spaced-apart positions 34, 36 transversely of the longitudinal dimension of sheet 30 thereby providing that folds 34, 36 are spaced apart and away from the plane originally defined by the surface 32. As illustrated, folds 34, 36 are parallel to the aforementioned plane and are spaced apart a distance providing for a portion 38 of the surface 32 which lies in the plane of the original surface 32 intermediate folds 34, 36. However, in an alternative embodiment, not shown, portion 38 can be omitted by spacing folds 34, 36 closer together without any adverse effect. In either case, ample flat surfaces 40, 42 should be provided adjacent the opposite ends of sheet 30 after the folds 34, 36 are formed therein to provide for a rigid attachment of support 28 to the surface 16 of element 12. Adjacent to folds 34, 36 but spaced from folds 34, 36 and the plane of the original surface 32 are openings 44, 46, 48 and 50 which are in registry with each other and have a specific shape which will be described hereinafter.

Positioned in the openings 44 through 50 is a bar 52. Bar 52, which is made of metal bar stock such as bar steel or other materials having suitable characteristics which will be mentioned hereinafter, is elongated in one direction and has a width substantially larger than the thickness thereof. Bar 52 is longer than element 12 of the grape vine trellis, and therefore, when positioned in openings 44 through 50, has opposite ends 54, 56 which extend beyond ends 18, 20 of element 12. So positioned, bar 52 extends longitudinally of element 12 and extends transversely to the direction of the row of posts 10. Bar 52 is rigid in the direction of the width of bar 52 and flexible in the direction of the thickness of bar 52. The material of bar 52 is chosen such that bar 52, secured to element 12 as above-described, may be flexed in the direction of arrow 58 toward and away from surface 16 without exceeding the elastic limit thereof.

Adjacent ends 54, 56 of bar 52 are openings 60 in bar 52 which are adapted to receive cordon wires 62 which are stretched between the respective posts 10. Alternatively, chain links 64, illustrated in FIGS. 3 and 4, can be inserted in holes 60 to support cordon wires 62 if so desired. By this means, and the proper selection of the height of posts 10, the preferable height of the cordon wires 62 can be obtained.

As illustrated in FIG. 2 and aforementioned, bar 52 is positioned in openings 44 through 50 of support 28. Openings 44 through 50 have a shape which is substantially the same shape as the cross-section of bar 52 thereby providing that when bar 52 is positioned in openings 44 through 50, bar 52 is held by support 28 rigidly thereby preventing movement between support 28 and bar 52 in all directions other than that indicated by arrow 58. Support 28 is secured to surface 16 of element 12 by means of several screws or spikes 66 thereby permitting support 28 and bar 52 to be fastened to a conventional trellis support post without the need of any special tools or welding, brazing and the like. Support 28 secured to the trellis as indicated in FIG. 2 functions both as a supporting member for bar 52 and a fulcrum of bar 52 whenever bar 52 is moved in the direction indicated by arrow 58.

Now referring to FIG. 3, there is shown a second embodiment of the improved trellis structure of this invention. This second embodiment, like the first embodiment illustrated in FIGS. 1 and 2, comprises support posts 10 and bars 52 which are similar to the same elements illustrated in FIGS. 1 and 2 and bearing the same reference numerals. However, bar 52 is modified slightly in this second embodiment and therefore will be referred to by the reference numeral 52a. This slight modification of bar 52 comprises the provision of a plurality of openings 68 in bar 52a intermediate the ends 54a, 56a thereof, three such openings being shown. Openings 68 provide means by which bar 52a can be secured to the top of post 10 directly without the need for element 12. Inserted through openings 68 are relatively strong and suitably large screws or spikes 70 which are driven longitudinally in the post from end 11. Thus secured, bar 52a is capable of movement in the direction of its thickness as indicated by arrow 72 and is restrained from movement in all other directions by screws or spikes 70.

Further, since bar 52 is unsupported except in the portion in contact with the post 10, and therefore, can flex downwardly when loaded with a curtain of grapevine foliage, two supports 74, 76 are provided to maintain the bar 52a in a generally horizontal position as illustrated. For all practical purposes, the supports 74, 76 are identical and can be made of a variety of configurations. Generally, support elements 74, 76, to perform their function, need only have adjacent one end thereof a foot portion 78, 80, respectively, by which the support elements 74, 76, respectively, can be secured to the posts 10 and a distal end portion 82, 84 respectively, against which bar 52a can rest and be restrained from movement vertically downwardly when loaded with grapevine foliage.

Referring now to FIG. 4, there is illustrated a third embodiment of the improved grape trellis structure of this invention. This third embodiment also includes bar 52 which is similar to bar 52 illustrated in FIGS. 1 and 2, and like bar 52a, is modified, and therefore, is given the reference numeral 52b. The modification of bar 52 to bar 52b comprises the provision of two openings 86 spaced apart from each other and adjacent to openings 60. In this third embodiment, posts 10 are also modified to have a slot 88 therein adjacent the top of post 10 but spaced therefrom. Slot 88, like openings 44 through 50, is provided with a cross-sectional shape substantially the same as the shape and size of the cross-section of bar 52b thereby allowing bar 52b to be inserted therein and to be secured to post 10. Slot 88 in post 10 therefore prevents bar 52b from moving in a direction transverse to the direction indicated by arrow 90. Further, since bar 52b, like bar 52a, can be flexed downwardly by the weight of the grapevine foliage which will be supported thereby, bar 52b must also be supported. Therefore, supports 92 are secured to bar 52b by openings 86 on both sides of post 10 and secured to post 10 at a position spaced apart and above the slot 88. In a specific embodiment, the supports 92 can be relatively strong wire; however, in each case, supports 92 must be flexible in order to accommodate the movement of bar 52b in the direction of arrow 90. The bar 52b thus secured to the post 10 is supported by the members 92 in a generally horizontal position, prevented from moving downward from the position illustrated and is free to move upwardly in the direction of arrow 90. This third embodiment is highly desirable when the improved trellis structure of this invention is desirably mounted on posts 10 having splits or cracks in the post adjacent to the top 11 of the post 10. It is readily obvious that by wrapping the end portions 92a of the supports 92, if they comprise relatively strong wire, around the post, the split top end of the post 10 can be held together in a manner that will retard the propagation of the crack through the remaining portion of the post. From the above description, it is obvious that the bar 52b could be modified in a variety of ways from the bar 52 and still provide for the attachment of the supports 92 without providing for the holes 86 therein. For example, eyelets, notches in the side of the bar 52b, or other means by which a wire could be attached to the bar 52b, can be positioned as are the opening 86, all of which are not shown, and could be used in place of opening 86.

Referring now to FIG. 5, there is shown a fourth embodiment of this invention comprising the bar 52a and the trellis element 12. In this embodiment the trellis element 12 is mounted on the end 11 of posts 10 as illustrated in FIGS. 1 and 2 and above-described in relation thereto. The bar 52 in this embodiment is identical to the bar 52a in the second embodiment of this invention and illustrated in FIG. 3. In this fourth embodiment of this invention however, bar 52a is secured to the element 12 by means of the screws or spikes 70 inserted through the holes 68 and into the element 12 in such a manner that the bar 52a lies on the surface 16 of the element 12 and has its ends 54a, 56a, respectively, overhanging ends 18, 20 of element 12. Thus secured to element 12, bar 52a is capable only of movement upwardly and away from the surface 16 as indicated by arrow 94. Element 12, in this embodiment, supports the bar 52a in much the same position as supports 74, 76 of the second embodiment of this invention and the supporting elements 92 of the third embodiment of this invention.

Now referring to FIG. 6, there is shown a fifth embodiment of this invention comprising an element 12 which is secured to the top of post 10 in the same manner as illustrated in FIGS. 1 and 2 and described with reference to the first embodiment of this invention, but which otherwise varies from the afore-mentioned structure. In this embodiment, there is secured to the element 12 a rod 96 which extends transversely of the element 12 intermediate the ends 18, 20 thereof. Rod 96 extends from adjacent one edge of surface 16 to the other edge and is generally perpendicular thereto and aligned in the general direction of the row of posts 10 illustrated in FIG. 1. Rod 96 is positioned on the surface 16 of the element 12 and is secured to the element 12 by means of several staples 98 as illustrated; however, rod 96 could be secured to the element 12 by any other conventional means.

Pivotally connected to the rod 96 by means of tubular end portions 100 are a pair of identical bars 102. Bars 102 extend from their tubular portion 100 through which rod 96 passes generally perpendicularly away from rod 96 and longitudinally of element 12 in opposite directions. Bars 102, like the bar 52a in the fourth embodiment of this invention illustrated in FIG. 5, rest upon surface 16 of the element 12. Bars 102 are otherwise similar to the bars 52 except they are substantially shorter since they need only to extend from the rod 96 to a position beyond the respective ends 18, 20 of the element 12 a distance similar to that distance bars 52, 52a, 52b extend beyond the same ends of the element 12 in the embodiments above-described and illustrated. Bars 102 therefore have distal ends 104, 106, respectively, which extend beyond the ends 18, 20 of the element 12. Adjacent to the ends 104, 106, respectively, are openings 60 similar to the openings bearing the same reference numeral in the bars 52, 52a, and 52b. As is apparent from FIG. 6, the bars 102 are supported by the element 12 and in much the same manner as bar 52a is supported by the element 12 in the fourth embodiment of this invention illustrated in FIG. 5, and thereby, are movable only upwardly in the direction indicated by the arrow 108. Motion of the bars 102 in other directions is prevented by providing a snug fit between the rod 96 and the tubular portions 100 of the bars 102 and by the rigid securance of the rod 96 to the element 12.

Now referring to FIG. 7 and a sixth embodiment of this invention, there is shown an element 12 which again is intended to be secured to the posts 10 in the same manner as illustrated in FIGS. 1 and 2 and described with reference to the fourth and fifth embodiments of this invention. This embodiment of the invention utilizes a relatively short bar 110 which can have a cross-sectional shape and dimension equal to bars 52, 102 and which has opposite ends 112, 114. Adjacent end 112 there is provided an opening 60 which can be identically shaped and positioned from end 112 as the opening having the same reference numeral aforesaid with respect to the first five embodiments of this invention. Adjacent end 114 of bar 110 there are formed to the bar several ears 116 which cooperate with the ears 118 of a conventional hinge plate 120 to hingedly connect the bar 110 thereto. Hinge plate 120 is secured to surface 16 of element 12 adjacent its ends 18, 20, respectively, by means of screws or spikes 121 with the end 112 of bar 110 extending generally perpendicularly beyond the respective ends 18, 20 of the trellis element 12 a distance equal to the distance mentioned with reference to the fifth embodiment of this invention. Thus secured to element 12, bars 110 are supported by element 12 in a generally horizontal position as are bars 52a, 102 of the fourth and fifth embodiments of this invention. Thus supported, bars 102 are movable only in an upward direction as indicated by arrow 122.

Now referring to FIG. 8 and a seventh embodiment of this invention, there is shown a post 10 having a modified element 12 secured adjacent the top 11 thereof. This modified element 12 will be referred to hereinafter by the reference numeral 12a to indicate its modification. Element 12a is identical in all respects to the element 12 except for a provision of the two grooves 134, 136 in the surface 16a, transversely disposed of the element 12a, adjacent to opposite ends 18a, 20a, respectively. Element 12a similarly to element 12, is secured to post 10 intermediate ends 18a, 20a with top 11 of post 10 (not shown) abutted against surface 14a near the middle thereof and with the element 12a extending on both sides of the post 10 in a direction transverse to the direction of the row of posts 10 of the trellis. Element 12a is secured to posts 10 by means of a pair of looped wires 138, 140 which are positioned around posts 10 and in grooves 134, 136 in element 12a, respectively. Wires 138, 140 are wound at positions 142, 144, respectively, until the wires 138, 144 are suitably shortened to become taut, to conform at the opposite ends thereof to the shape of the element 12a and the post 10, respectively, and to rigidly hold the element 12a to the post 10. Thus secured to post 10, element 12a is incapable of movement with respect to post 10.

Secured to the surface 16a of element 12a intermediate ends 18a, 20a and preferably in registry with the top 11 of post 10 is a bar 52c. Bar 52c, similarly to bars 52, 52a and 52b, is made of metal bar stock such as bar steel or other materials, is elongated in one direction, and has a width substantially larger than the thickness thereof. Bar 52c is longer than element 12a and therefore, when positioned on element 12a, has opposite ends 54c, 56c which extend beyond the ends 18a, 20a of elements 12a. So positioned, bar 52c extends longitudinally of element 12a and extends transversely to the direction of the row of posts 10, such as illustrated in FIG. 1. Intermediate ends 54c, 56c of the bar 52c, a fulcrum portion is integrally formed therein to have a base portion 148 and two upstanding wall portions 150, 152 which are generally perpendicular to base portion 148 and the remainder of bar 52c. Base portion 148 and wall portions 150, 152 define a U-shaped structure. Base portion 148 is secured to the surface 16a of the element 12a by means of bolts 154, 156, screws, or the like. Portion 146 of bar 52c defines opposite end portions 158, 160 of bar 52c which extend from wall portions 150, 152 to the distal ends 54c, 56c, respectively. End portions 158, 160 are spaced apart from the surface 16a of element 12a and are generally parallel to both the surface 16a and base portion 148 when the bar 52c is in its unflexed and unloaded position. Bar 52c, like bars 52, 52a and 52b, is rigid in the direction of the width of bar 52c and flexible in the direction of the thickness of bar 52c and arrow 162 when mounted on element 12a. The material of bar 52c is chosen such that bar 52c may be flexed in the direction of arrow 162 toward and away from surface 16a without the bar 52c exceeding the elastic limit thereof. As illustrated in FIG. 8, bar 52c is in its loaded position whereby the bar 52c rests upon surface 16a adjacent its opposite ends 54c, 56c. In this loaded position, bar 52c can only be flexed upwardly and away from surface 16a, as will be described hereinafter.

Adjacent ends 54c, 56c of bar 52c are staples 164, 166 which are adapted to receive the cordon wires 62, respectively, which extend between the posts 10 of a trellis (see FIG. 1). The use of staples 164, 166 is an alternative means for securing the cordon wires 62 to the bar 52c. The holes 60 and the chain links 64, hereinabove described and illustrated in FIGS. 3 and 4, can also be used. Likewise, the staples 164, 166 can be used with the other seven embodiments of this invention in place of the holes 160 and the chain links 164.

Now referring to FIG. 9, and an eighth embodiment of this invention, there is shown an element 12a which is intended to be secured to the posts 10 in the same manner as illustrated in FIG. 8 and above-described with reference to the seventh embodiment of this invention. This embodiment of the invention utilizes bar 52a which is secured in spaced-apart relation to element 12a by means of a fulcrum 168 which can be made of any substantially rigid and durable material, such as rubber, wood, metal and the like. Bar 52a is secured to element 12a by means of a plurality of screws, nails, or other fasteners 170 positioned in openings 70 of bar 52a. In all other respects, the eighth embodiment of this invention is similar to the fourth embodiment of this invention illustrated in FIG. 5, except, of course, for the bar 52a being flexible in the direction of arrow 172 in the eighth embodiment of this invention, both towards the surface 16a to assume the position illustrated and away from surface 16a, in contrast to the bar 52a in the fourth embodiment which can only be flexed away from surface 16 of element 12.

In a specific embodiment of this invention, posts 10 are made of wood or reinforced concrete and element 12 is made of wood. For both posts 10 and element 12, either black locust, red cedar, white oak, and heart wood of white cedar, which are very durable and resist rot without the addition of wood preservatives, or other suitably strong woods treated with chemical preservatives, such as cresote, should be used. Bars 52, 52a, 52b, 52c, 102 and 110; supports 22, 138, 140; supporting elements 74, 76; and hinge plate 120 are preferably formed of metal of a gauge or thickness sufficient to bear the load to which they are subjected by the grapevine foliage which they support; but, can be made of certain woods and plastics. However, the bars 52, 52a, 52b and 52c, since they must be capable of flexing in the direction of the thickness of the bar, must also be chosen to be made of a gauge or thickness of material such that flexing the bar is possible without exceeding the elastic limit of the bar. In each of the embodiments, the flexible bars 52, 52a, 52b and 52c are supported by either the element 12, the supporting members 74, 76, or the supports 92; and therefore, can be chosen to be of a thickness such that the flexing of the respective bars is possible without regard to the breaking strength of the bars if the aforementioned supporting members are chosen with sufficient strength to support the grapevine foliage supported by the bars and thereby preventing downward deflection of the bars beyond the elastic limits thereof.

In operation, all of the embodiments above-described and illustrated in the figures operate in the identical manner; and therefore, reference will only be made to the first embodiment of this invention and the operation thereof will be described hereinafter with the understanding that the description will be equally applicable to the other embodiments of this invention.

Referring now to FIG. 10 in which the first embodiment of this invention illustrated in FIGS. 1 and 2 is shown in fragment, the description of the operation of the invention will follow. As aforementioned with reference to FIG. 1, each of the embodiments of this invention are mounted on trellis support posts 10, which are arranged uprightly in a row. Also, each of the embodiments of this invention as above-described and illustrated in the drawings are capable of supporting two cordon wires 62 as illustrated in FIG. 1. FIG. 10 illustrates only one end of bar 52 and element 12 of the first embodiment of this invention; however, the bar 52 will be understood to operate at the other end thereof in an identical manner. Further, FIG. 10 illustrates two portions of the conventional machinery designed to mechanically harvest grapes. The first portion of the machinery shown is a moving conveyor 124 which is positioned beneath the curtain of grape vine foliage which extends from the proximity of the post 10 outwardly in the direction of element 12 and overhangs the cordon wire 62 illustrated in FIG. 10. The second portion of the mechanical harvester illustrated is a wheel 174 which is secured to the end of a shaft 126. Shaft 126 is operatively connected to the mechanical harvester to be rotatable in the direction indicated by arrow 176 and to be movable in both the the vertical direction indicated by arrow 178 and in a generally horizontal direction as indicated by arrow 180. Wheel 174 has a plurality of spokes 182 radially extending from its peripheral surface 184. In operation, wheel 174 of the mecahnical harvester engages the cordon wire 62, as illustrated in FIG. 10, at its peripheral surface. The cordon wire 62 is held in connection with the peripheral surface of the wheel 174 by means of spokes 182 and by the resiliency of the wire. The mechanical harvester imparts vertical vibratory motion to the cordon wire 62 and the grapevine foliage supported thereby, both upwardly and downwardly, by means of imparting vertical vibratory motion to the shaft 126 and the wheel 174 in direction of arrow 178. This vibratory motion of the cordon wire 62 results in the similar flexing movement of bar 52, as indicated by arrow 128. The respective movements of the cordon wire 62 and bar 52 is indicated by the dashed line position of bar 52 and cordon wire 62 referred to by reference numerals 130, 132, respectively, in FIG. 10. Further, wheel 174 moves longitudinally of cordon wires 62 by rotary motion of shaft 126 as indicated by the arrow 176 and by arrow 180. Thus, as above-described, the mechanical harvester can move longitudinally of the cordon wire 62 and vibrate the cordon wire 62 upwardly and downwardly in a vertical direction in localized areas. By relatively rapid and oscillatory movement of the cordon wires 62 in this manner, the whole curtain of grapevine foliage resting on the cordon wires 62 is moved in this manner to shake the grapes thereon from the vine and to deposit the grapes into the conveyor belt 124. In a specific embodiment of this invention, the cordon wires 62 are moved by the mechanical harvester approximately four inches between the position illustrated in solid lines in FIG. 10, which is the position the cordon wire assumes when loaded with grapevine foliage, and the position shown in dotted lines and indicated by the reference numeral 132. Since bar 52 is rigidly secured to post 10 and is capable of substantial movement only in one direction, by mounting bar 52 such that this one direction is vertical, the movement of bar 52, the cordon wire 62 connected thereto, and the grapevine foliage supported thereby will have only vertical components. Thus, the berries which are shaken loose from the grapevine foliage will travel in a vertical direction only, and thereby, will not scatter and will fall only onto the conveyor belt 124.

By the apparatus of this invention hereinabove described, the whole curtain of grapevine foliage resting on the cordon wires 62 may be moved in relatively rapid oscillatory motion by the wheel 174 of the mechanical harvester so as to allow grapes to be successfully mechanically harvested. Further, by this invention, scattering of the grapes freed from the vines by the aforementioned oscillatory motion is eliminated by the fact that the bar 52 can only move in a vertical direction and further, this movement is achieved without introducing damaging stresses to the element 12 or posts 10. Thus, the apparatus of this invention protects posts 10 from damage by the mechanical harvester. Further, the apparatus of this invention can be manufactured relatively inexpensively, can be used to modify grapevine trellis structures already in use, and thereby so modify these structures so that the grapes growing thereon can be harvested mechanically, and further, provides a grapevine trellis which is more durable than heretofore used in conventional vineyards.

When a specific mechanical harvester is used with the improved trellis structure of this invention, it has proven to be desirable that the two cordon wires 62, which are supported by members 12, 12a of the trellis structure, be spaced apart a constant distance that will not vary. Each of the embodiments illustrated and above-described is provided with the openings 60 in bars 52, 52a, 52b, 52c, 102 and 110, or staples 164, 166 secured thereto for this purpose. Thus, if a constant distance between cordon wires 62 is desired, the cordon wires can either be threaded through the respective openings 60 or staples 164, 166.

On the other hand, if this feature is not deemed important in a specific application, the chain links 64 may be utilized as illustrated in FIGS. 1, 3 and 4 to support cordon wires 62 as illustrated in FIG. 1. The use of chain links 64 gives additional versatility to the trellis structure of this invention by providing that the height of the respective cordon wires 62 can be adjusted by using one or more chain links to support the cordon wires beneath bars 52, 52a, 52b, 52c, 102 and 110 any distance that is desired.

While there have been described above the principles of this invention in connection with specific apparatus, it is to be clearly understood that this description is made only by way of example and not as a limitation to the scope of this invention.

What is claimed is:

1. A grape trellis comprising a plurality of rigid support posts arranged in an upstanding position in a row, said posts being spaced apart from each other and rigidly secured in said position, a plurality of elongated members having opposite ends, one of said members being secured to the top of each of said posts, respectively, with said members extending on both sides of said posts transversely of the direction of said row, a plurality of elongated bars and means for securing each of said bars to a respective member intermediate said member ends, each of said bars extending beyond said member ends and having means respectively adjacent to said member ends for connecting said bars to an elongated wire-like element for supporting a curtain of grape vine foliage thereon, said bars having an at-rest position in which said bars rest on said members, said bars being movable generally vertically upwardly away from said position and generally vertically downwardly back toward said position, said bars being supported in said position by said members, said securing means including means for confining the movement of said bars to movement in a generally vertical and upwardly direction away from said position and to movement in a generally vertical and downwardly direction back toward said position.

2. A grape trellis comprising a plurality of rigid support posts arranged in an upstanding position in a row said posts being spaced apart from each other and rigidly secured in said position, a plurality of elongated bars and first means for securing each of said bars to a respective post adjacent the top thereof with said bars respectively extending outwardly away from said posts in a direction transverse to the direction of said row whereby said bars have distal ends spaced from said posts, said bars having second means adjacent to said distal ends for connecting said bars to an elongated wire-like element for supporting a curtain of grapevine foliage, third means attached to said post and to said distal ends for supporting said bars with said curtain connected thereto in an at-rest position, said bars adjacent to said distal ends being movable generally vertically upwardly away from said position and generally vertically downwardly back toward said position, said first and third means being adapted to confine the movement of said bars to movement in a generally vertical and upwardly direction away from said position and to movement in a generally vertical and downwardly direction back toward said position.

3. A grape trellis post attachment comprising an elongated bar and first means for securing said bar to an upright post of a trellis with said bar extending from said post with one end thereof spaced from said post, second means to be attached to said post and to be positioned adjacent to said one end of said bar for supporting said bar with a curtain of grapevine foliage connected thereto in an at-rest position, said bar adjacent to said one end being movable generally vertically upwardly away from said position and generally vertically downwardly back toward said position.

4. A grape trellis post attachment comprising an elongated cross bar with opposite ends, first means for securing said cross bar to an upright post of a trellis with said cross bar extending from said post and said bar ends positioned on opposite sides of said post, second means to be attached to said post and to be positioned adjacent to said bar ends for supporting said bar with a curtain of grapevine foliage connected thereto in an at-rest position, said bar being movable generally vertically upwardly away from said position and generally vertically downwardly back toward said position, said first and second means being adapted to confine the movement of said bar to movement in a generally vertical and upwardly direction from said position and to movement in a generally vertical and downwardly direction back toward said position.

5. A grape trellis post attachment comprising a bar elongated in one direction and having opposite ends, said bar having a width and a thickness dimension both of which are measured transversely of said one direction, said width dimension being larger than said thickness dimension, said bar being flexible in a direction of said thickness dimension and substantially rigid in the direction of said width dimension, first means connected to said bar adjacent to one end thereof for connecting said bar to an elongated wire-like element for supporting a curtain of grapevine foliage, second means for mounting said bar to a trellis support post with the direction of said thickness dimension being generally vertical, said bar being flexibly movable with respect to said second means in said one direction generally vertically upwardly away from an at-rest position and generally vertically downwardly back toward said position, said second means including a trellis element, a spacer, and means for securing said bar and spacer to said trellis element, said spacer being positioned between said bar and said element, said bar extending beyond said element and said one bar end being spaced from said element, said element being beneath said bar, said bar adjacent to said spacer being spaced apart from said element, said bar adjacent to said one bar end engaging said element in said position, whereby said element supports said bar in said position.

6. The attachment of claim 5 wherein said bar and spacer are integrally formed together as a single piece.

7. A grape trellis support attachment comprising a cross bar elongated in one direction and having opposite ends, said bar having a width and a thickness dimenion both of which are measured transversely of said one direction, said width dimension being larger than said thickness dimension, said bar being flexible in the direction of said thickness dimension and substantially rigid in the direction of said width dimension, first means respectively adjacent to said bar ends for connecting said bar to second means for supporting a curtain of grapevine foliage, third means secured to said bar intermediate said bar ends for mounting said bar to a trellis support post adjacent the top thereof with the direction of said thickness dimension being generally vertical, said bar extending from said post on opposite sides thereof, and fourth means to be attached to said post and to be positioned adjacent to said bar ends for supporting said bar with a curtain of grapevine foliage connected thereto in an at-rest position, said bar being movable with respect to said third means in said direction of said thickness dimension generally vertically upwardly away from said position and generally vertically downward back toward said position, said third and fourth means being adapted to confine the movement of said bar to movement in a generally vertical and upwardly direction away from said position and in a generally vertical and downwardly direction back toward said position.

8. A grape trellis post attachment comprising a bar flexible in one direction and elongated in a second direction and having opposite ends, said bar having a width substantially larger than the thickness of said bar thereby being rigid in the direction of the width of said bar, said one direction being in the direction of the thickness of said bar, first means respectively adjacent said ends of said bar for connecting said bar to second means for supporting a curtain of grapevine foliage, a trellis element, third means secured to said bar for mounting said bar to said trellis element with said bar extending beyond said element and with said bar ends, respectively, being spaced from said element, said element supporting said bar in an at-rest position, said bar being movable with respect to said third means in said one direction generally vertically upwardly away from said position and generally downwardly back toward said position, said third means and said element being adapted to confine the movement of said bar to movement in a generally vertical and upwardly direction away from said position and to movement in a generally vertical and downwardly direction back toward said position.

References Cited
UNITED STATES PATENTS
| | | | |
|---|---|---|---|
| 2,449,778 | 9/1948 | Hyde | 248—353 |
| 2,893,194 | 7/1959 | Lamouria | 56—331 |

FOREIGN PATENTS
| | | |
|---|---|---|
| 11,733 | 2/1906 | Great Britain. |
| 502,840 | 7/1930 | Germany. |
| 818,136 | 10/1951 | Germany. |
| 663,947 | 1/1952 | Great Britain. |

ROBERT E. BAGWILL, *Primary Examiner.*